Sept. 21, 1965      D. WOFSEY      3,207,886
A.C.–D.C. WELDING METHOD
Filed Sept. 13, 1962      2 Sheets-Sheet 1
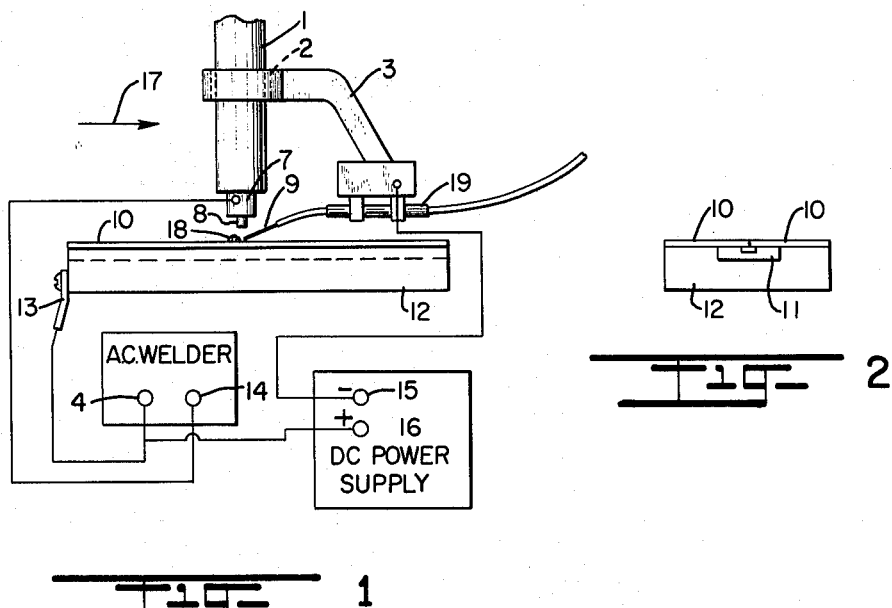
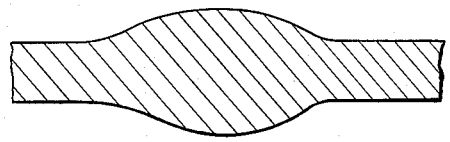
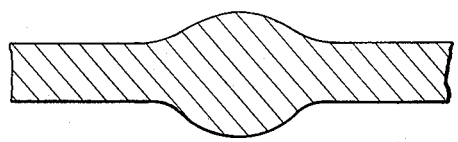
INVENTOR.
DAVID WOFSEY
BY Philip H. Sheridan
ATTORNEY

United States Patent Office 3,207,886
Patented Sept. 21, 1965

3,207,886
A.C.-D.C. WELDING METHOD
David Wofsey, Denver, Colo., assignor to Martin-Marietta Corporation, Baltimore, Md., a corporation of Maryland
Filed Sept. 13, 1962, Ser. No. 223,326
4 Claims. (Cl. 219—131)

This invention relates to a welding apparatus and method, and more particularly to such an apparatus and method employing a combination of A.C. and D.C. current in the welding process.

The welding of metals, such as aluminum, presents a problem in that the welds tend to be somewhat porous and of low tensile strength. Close inspection of the welds reveals uneven penetration, serpentine weld surfaces, poor casting and irregular weld edges. To minimize these welding problems, such metals generally are welded with the use of a minimum amount of current so that the weld temperature is kept down sufficiently to prevent undue oxidation of the weld seam, which is blamed for the production of porous welds of low tensile strength and the other characteristics listed above.

Accordingly, it is an important object of this invention to provide a welding apparatus and method which results in the production of welds of improved tensile strength.

Another object of this invention is to provide such an apparatus and method which permits the use of lower welding currents, with even weld penetration.

A further object of this invention is to provide a welding circuit and method which will minimize, or eliminate, porosity in welds of metals such as aluminum, for example.

A still further object of this invention is to provide a welding circuit and method which will permit weight reductions in the welds, cost reductions in the use of electric power, savings in the use of less welding wire and the reduction of rework welds and scrap metal.

Additional objects will become apparent from the following description, which is given primarily for purposes of illustration, and not limitation.

Stated in general terms, the objects of this invention are attained by providing a welding apparatus and circuit, or method, which comprises an A.C. welding system, or arrangement, with which an auxiliary D.C. circuit is combined. The auxiliary D.C. current, in accordance with the invention, is passed through the work piece or member, the weld puddle and the feed wire. The D.C. circuit preferably is electrically isolated from the A.C. welding circuitry, except for the work piece and the weld puddle, and the feed wire preferably is maintained negative with respect to the work piece. By this arrangement, it is believed that any eddy currents established in the weld puddle by the A.C. welding current, are effectively neutralized to thereby decrease any tendency toward porosity in the weld, and thus increase the tensile strength of the completed weld.

A more detailed description of a specific embodiment of the invention is given below with reference to the accompanying drawings, wherein:

FIG. 1 is a schematic side elevational view showing a welding arrangement including A.C. welding circuitry and auxiliary D.C. current passed through the work piece, the weld puddle and the feed wire;

FIG. 2 is an end view of the work piece of FIG. 1;

FIG. 4 is a schematic representation of an actual photograph showing the cross-sectional structure of the center portion of a weld bead obtained when only the A.C. welding circuit is used to weld aluminum;

FIG. 5 is a similar cross-sectional view showing the structure of the center portion of a weld bead obtained when the auxiliary D.C. circuit is combined with the A.C. circuit in accordance with the invention;

Figure 3:
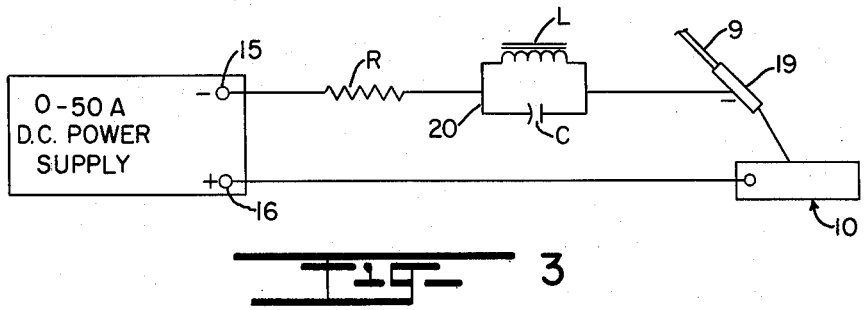
FIG. 3 is a schematic representation of the auxiliary D.C. circuit combined with the A.C. welding circuit.

FIGS. 1 and 2 show the application of the apparatus and method of the invention to welding aluminum sheet, for example. For simplicity, fixture clamps are not shown. The edges of two sheets 10, of aluminum to be welded, are arranged in abutting relationship upon a weld supporting fixture 11, which in turn is supported by a fixture 12, as best shown in FIG. 2. The A.C. welder terminal 14 is connected to welding electrode 8 supported in welding head 7, which, in turn is mounted in holder 1. The ground terminal 4 of the A.C. welder is connected to the work sheets 10 through a ground terminal contact 13. During welding an arc is struck between the welding electrode 8 and the work sheets 10 to form a welding puddle at 18. Attention is drawn to the latter arrangement in that the weld puddle is created and maintained by the A.C. current through electrode 8. A welding feed wire 9 is maintained constantly in contact with the edge of welding puddle 18, as it traverses along the welding seam, formed between work sheets 10, with the welding head 7 traveling in the direction of arrow 17. Of course, the welding head motion may assume irregular patterns.

The welding feed wire 9 is fed continuously into the welding puddle 18 through a wire feed tube 19, mounted, as best shown in FIG. 1, on welding head holder 1 by bracket 3. An insulator 2 insulates the feed wire 9 from ground. The negative pole 15 of an auxiliary D.C. power supply is connected to feed wire 9 through bracket 3 and feed tube 19. The positive pole 16 of the auxiliary D.C. power supply is connected to the work sheets 10, welding puddle 18 and the feed wire 9. The feed wire 9 is biased, or polarized, negatively by the auxiliary D.C. current. It is believed that, in this manner, any ions that form in the welding puddle 18, are caused to move through the puddle, and any tendency to establish eddy currents in the welding puddle by the A.C. welding current is effectively prevented or minimized. As will be described in connection with FIGURES 4 and 5, the relatively small D.C. current input to puddle 18 induces a reduction in the heat affected zone so as to minimize heat dissipation and thereby provide a considerably improved weld. In effect, a controlled, concentrated zone of welding is developed which, due to such controlled puddle configuration, allows for higher weld penetration. This penetration obtains without the disadvantages attendant with the higher heat input requirements for such penetration in conventional welding systems.

A specific embodiment of the auxiliary D.C. circuit is shown in FIG. 3 employing a zero to 50 ampere D.C. power supply 15, 16. Positive pole 16 is connected to work 10 (welding puddle 18) and feed wire 9; while negative pole 15 is connected to feed wire tube 19 and feed wire 9 through a power resistor R of .25 ohm and a choke 20. Choke 20 includes an inductance coil L of .001 henry and a capacitor C connected in parallel with respect to each other to produce a parallel resonant circuit that is tuned to the welding current frequency. The auxiliary D.C. circuit of FIG. 3 was added to a tungsten inert gas welding apparatus, in the manner shown in FIG. 1.

The required auxiliary D.C. current, after optimizing the welding parameters in order to obtain maximum yield strengths of welds, was found to be about 15% of the A.C. welding current. If the process is used without optimization, there generally are no adverse effects on the weld bead. However, the weld current preferably should be reduced to approximately 5% above the threshold penetration for A.C. current before adding the auxiliary D.C. current to the apparatus.

A comparison of FIG. 5 with FIG. 4 shows a reduction in the heat-affected zone and an improvement in the bead contour produced when welding sheets of 0.100 inch thick aluminum by the method of the invention, employing auxiliary D.C. current, as compared with the prior art A.C. welding method. FIG. 4 shows the production of a .500 inch bead with an uneven surface while using the prior art A.C. welding method. FIG. 5 shows the production of a greatly reduced bead of .390 inch having a smooth, curved surface when an auxiliary D.C. current of 25 amperes was added to the A.C. welding current, while using the auxiliary D.C. circuit shown in FIG. 3. This is a reduction of about 35% in the heat-affected zone by the use of the invention. Improvements in weld penetration and welding rate also were achieved when using the A.C.-D.C. welding method of the invention, and employing the circuit of FIG. 3. As pointed out hereinabove, it is believed that the auxiliary D.C. current operates on the principle of applying a magnetic field to the welding puddle, and tends to prevent the establishment of eddy currents in the welding puddle.

Figure 6:
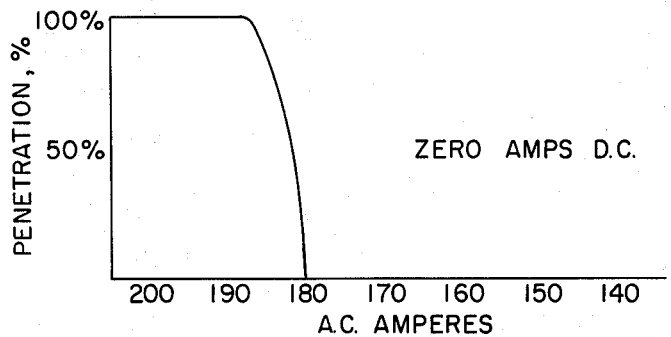
FIG. 6 is a graph showing the relationship of penetration in percent with the amount of A.C. current employed in amperes, in the welding operation when welding .1 inch thick aluminum sheet with zero D.C. auxiliary current added.
Figure 7:
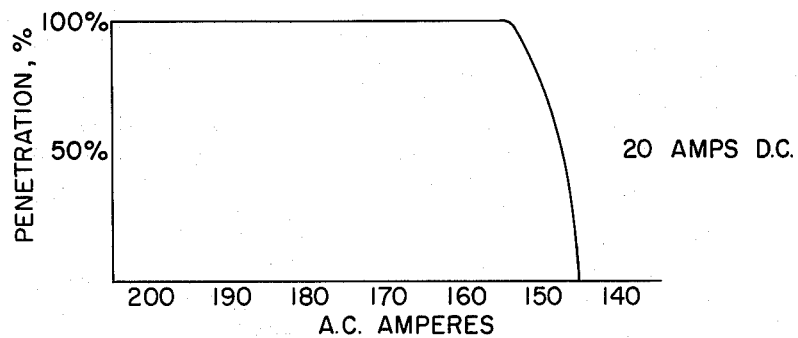
FIG. 7 is a similar graph showing the results obtained when 20 amperes of D.C. auxiliary current is added to the A.C. current, in accordance with the invention.

FIGS. 6 and 7 graphically show a comparison of the percent penetration obtained in welding sheets of 0.100 inch thick aluminum with a constant arc voltage, constant electrode travel speed and constant feed wire rate. FIG. 6 shows that without adding any auxiliary D.C. current to the A.C. welding apparatus, the threshold of penetration for A.C. current was found to be 185 amperes. Then 20 amperes of auxiliary D.C. current was added to the welding puddle, and the A.C. current was decreased until penetration was lost at 150 amperes A.C. arc current. An acceptable weld specimen was obtained with an A.C. welding current as low as 155 amperes plus 20 amperes of added D.C. current. Thus a comparison of the results shows that a penetration advantage of about 18% was obtained when 20 amperes of auxiliary D.C. current was added, in accordance with the invention, as compared to the use of only A.C. welding arc current, in accordance with the prior art.

A tensile strength and yield comparison was made while welding 0.100 inch thick aluminum sheet while using an A.C. arc current of 190 amperes, an arc voltage of 11 volts with a constant electrode travel speed and a constant feed wire rate. In making the comparison, the weld test was started using the prior art A.C. welding process without the addition of auxiliary D.C. current, then at the halfway point of the test, 25 amperes of auxiliary D.C. current was switched into the welding puddle, in accordance with the process of the invention, without stopping the welding process on the weld test. A series of ten such strictly comparative tests of each process was made, and the ultimate tensile strength and yield data for the test were determined. The results showed about a 50% improvement in ultimate strength variation and about an 85% improvement in the yield variations.

To summarize, the use of the welding process of the invention, when applied to welding sheets of aluminum, as described hereinabove, has resulted in the following improvements over the prior art welding process:
(1) A 35% reduction in the total heat-affected zone.
(2) An 18% reduction in the penetration threshold.
(3) A 50% improvement in the ultimate-strength variations.
(4) An 85% improvement in the yield variations.
(5) An improvement in bead contour.

It will be understood that variations can be made in the apparatus and method of the invention described hereinabove. Also, the method and apparatus of the invention can be applied to welding metals other than aluminum. For example, it has advantageously been used in connection with the welding of tungsten and titanium.

The auxiliary D.C. current can be derived from the A.C. arc welding current by the use of a rectifier instead of using a separate D.C. power supply. The welding puddle may also be biased above ground negative or positive by positioning a rheostat in the return lead from the ground terminal of the A.C. welder 14 (FIG. 1) between ground terminal 4 and the auxiliary D.C. power supply 15, 16.

Obviously many other modifications and variations of the present invention are possible in the light of the above teachings. It is, therefore, to be understood that within the scope of the appended claims, the invention can be practiced otherwise than as specifically described.

What is claimed is:
1. A method of welding a work member comprising the steps of:
continuously forming a single alternating current arc on said work member to form a welding puddle in a heat affected zone of the member to be welded;
continuously feeding a welding feed wire into contact with the welding puddle; and
continuously passing a direct current through said work member, welding puddle and welding feed wire to continuously maintain said feed wire negative with respect to said work member during the welding operation.

2. A method of welding a work member, as set forth in claim 1, wherein:
said direct current has an intensity below that necessary for fusion but sufficient to minimize the size of said heat affected zone.

3. A method of welding aluminum comprising the steps of:
continuously forming a single alternating current arc on an aluminum work member to form a welding puddle in a zone of the member to be welded, said arc being formed by an alternating current having an amperage about 5% above that of the threshold alternating current for pentration of the work member;
continuously feeding a welding feed wire into contact with the welding puddle; and
continuously passing a direct current through the work member, welding puddle and welding feed wire to continuously maintain the feed wire negative with respect to the work member during the welding operation, said direct current having an amperage about 15% that of the alternating current.

4. A method of welding comprising the steps of:
continuously forming an alternating current arc upon a work member so as to establish a welding puddle in a zone of the member to be welded;
continuously feeding a welding feed wire into an edge of said welding puddle, said feed wire being in contact with said puddle;
and continuously passing a direct current through said feed wire and said welding puddle, said direct current having an intensity below that necessary for fusion but sufficient to minimize the size of said welding puddle.

References Cited by the Examiner

UNITED STATES PATENTS

| | | | |
|---|---|---|---|
| 2,478,985 | 8/49 | Steward et al. | 219—131 |
| 3,089,945 | 5/63 | Connoy et al. | 219—76 |
| 3,122,629 | 2/64 | Manz | 219—137 |

RICHARD M. WOOD, *Primary Examiner.*